United States Patent
Hvid et al.

[11] Patent Number: 6,132,598
[45] Date of Patent: Oct. 17, 2000

[54] CENTRIFUGE APPARATUS WITH TEMPERATURE CONTROL MEANS

[75] Inventors: Niels Hvid, Holte; Glenn A. Jorgensen, Allerod; Niels Erik Holm, Birkerød, all of Denmark

[73] Assignee: Bristol-Myers Squibb Company, New York, N.Y.

[21] Appl. No.: 09/004,357

[22] Filed: Jan. 8, 1998

Related U.S. Application Data

[60] Provisional application No. 60/034,050, Jan. 8, 1997.

[51] Int. Cl.[7] .................. B01D 17/12; B01D 17/038; B04B 15/02; G01K 17/00
[52] U.S. Cl. .................. 210/85; 210/149; 210/360.1; 210/742; 210/787; 374/1; 436/178; 494/1; 494/10
[58] Field of Search .................. 210/85, 149, 175, 210/360.1, 375, 380.1, 512.1; 632/742, 774, 781, 782, 787, 789, 806; 494/10, 11, 37, 43, 84, 85, 1; 374/1, 141, 210; 530/381, 382, 383, 384; 250/429, 430, 432 R, 433; 435/269; 436/178

[56] References Cited

U.S. PATENT DOCUMENTS

| | | |
|---|---|---|
| 3,073,517 | 1/1963 | Pickels et al. . |
| 3,600,900 | 8/1971 | Buddecke . |
| 3,604,769 | 9/1971 | Latham, Jr. . |
| 3,706,412 | 12/1972 | Latham, Jr. . |
| 3,849,252 | 11/1974 | Percs et al. . |
| 3,856,470 | 12/1974 | Cullis et al. . |
| 4,137,127 | 1/1979 | Stocker . |
| 4,300,717 | 11/1981 | Latham, Jr. . |
| 4,442,655 | 4/1984 | Stroetmann . |
| 4,859,420 | 8/1989 | Schultz ..................... 422/72 |
| 4,886,371 | 12/1989 | Fondin . |
| 5,100,372 | 3/1992 | Headley . |
| 5,223,420 | 6/1993 | Rabuad et al. . |
| 5,260,420 | 11/1993 | Burnouf-Radosevich et al. . |
| 5,395,923 | 3/1995 | Bui-Khac et al. . |
| 5,539,673 | 7/1996 | Charm et al. . |
| 5,603,845 | 2/1997 | Holm . |
| 5,733,446 | 3/1998 | Holm ..................... 210/360.1 |
| 5,750,657 | 5/1998 | Edwaroson et al. ........ 530/382 |
| 5,750,658 | 5/1998 | Coelho et al. ........... 530/382 |

*Primary Examiner*—Joseph W. Drodge
*Attorney, Agent, or Firm*—Theodore R. Furman, Jr.; John M. Kilcoyne; Stuart E. Krieger

[57] ABSTRACT

An apparatus is adapted to centrifuge and furthermore automatically handle a container (10) for separating a component, such as fibrin monomer, from plasma. The container (10) comprises a cylindrical member (11) and a piston (25) displaceable therein and comprising a tubular piston rod (12), which extends through the top wall. The piston (25) divides the cylindrical member (11) into a first chamber positioned above said piston (25) between said piston and said top wall and a second chamber positioned below said piston (25). The apparatus comprises a supporting turntable (1) with means for releasably retaining the cylindrical member (11), said supporting turntable being connected to a first activating mechanism (5) for rotating the supporting turntable (1) with the container (10) about the central axis thereof. The apparatus comprises furthermore a rotatably journalled piston activating mechanism (13, 15, 16) adapted to activate the piston by means of a second activating means (21). A heat-emitting device (26, 27) is provided opposite the position of the cylindrical member (11) in the apparatus.

9 Claims, 1 Drawing Sheet

CENTRIFUGE APPARATUS WITH TEMPERATURE CONTROL MEANS

RELATED APPLICATION

This Application claims priority from Provisional Application 60/034,050, filed Jan. 8, 1997.

TECHNICAL FIELD

The invention relates to methods and apparatus for centrifuging and monitoring/controlling the temperature of a liquid, e.g., blood, within a rotating centrifuge container.

BACKGROUND ART

U.S. Pat. No. 5,603,845, WO 96/16713, WO 96/16714 and WO 96/16715 disclose a method and a container for separating a component, such as fibrin monomer, from blood or plasma by centrifugation, whereby blood is fed to a first annular chamber in a device, where the annular chamber is defined by a cylindrical outer wall and a cylindrical inner wall, both walls extending coaxially about a common axis, as well as by a top wall and a bottom wall. The top wall is formed by a piston body displaceable within the first chamber. This method involves a centrifugation of the device about the said common axis to substantially separate blood into a cell fraction and a plasma fraction followed by the resulting plasma fraction being transferred while influenced by the piston body to a second chamber defined by an outer cylindrical wall. The outer cylindrical wall extends coaxially with the said common axis, whereby a fraction with fibrin monomer is caused to be separated in the second chamber while a suitable enzyme is being added. The separation of fibrin monomer from the plasma fraction in the second chamber is carried out during continued centrifugation whereby a polymerized fibrin is deposited on the cylindrical outer wall of said second chamber, whereafter the fluid fraction collected at the bottom of the second chamber is transferred while influenced by the piston body to the first chamber. The fraction with polymerized fibrin deposited on the cylindrical wall in the second chamber is caused to be dissolved by addition of a solvent and by centrifugation, whereafter it is transferred to a receiving container placed within the piston rod by passing after enzyme capture and filtration, whereby a fibrin monomer-containing solution is provided.

U.S. Pat. No. 5,603,845 discloses an apparatus for initiating such a centrifuging. This apparatus comprises a housing which is basically divided into three compartments, viz. an upper compartment, a central compartment, and a lower compartment. The container with the fluid to be separated is placed in the central compartment. It is placed on a rotatable supporting turntable which is rotatably journalled on a journalling shaft, said shaft constituting an output shaft of a motor which is housed in the lower compartment. Accordingly, this motor constitutes a means for generating the high rotational speed at which the container is to be rotated about its central axis at a number of process steps. The latter process steps correspond to the separating process which the fluid is to be subjected to in order to be separated into the desired fluid components. The container is retained on the supporting turntable by means of gripping means engaging openings shaped along the lower rim of the container. A motor is arranged in the upper compartment. The said motor co-operates with a gripping means which is rotatably journalled and adapted to be vertically displaced so as to engage and co-operate with the piston rod of the container. This centrifuge apparatus corresponds to the apparatus described in the introduction to the specification.

EP 592242 describes a novel fibrin sealant method which prepares and utilizes fibrin monomer which is understood to refer to fibrin I, fibrin II or des BB fibrin. The monomer can be prepared using apparatus and methods as described in the aforementioned U.S. Pat. No. 5,603,845, WO 96/16713, WO 96/16714 and WO 96/16715. Essentially, plasma fibrinogen is subjected to an enzyme which catalyzes the cleavage of fibrinopeptide A and/or B from fibrinogen, i.e., thrombin or a thrombin-like enzyme which converts fibrinogen to fibrin. Nondynamic fibrin monomer compositions can thereafter be obtained, for example, by solubilizing the resulting non-crosslinked fibrin polymer in a low Ph, i.e., about pH-4, buffer where the fibrin monomer is prevented from polymerizing until the pH is raised.

SUMMARY OF THE INVENTION

It has now been found that processes for producing and utilizing fibrin monomer are enhanced when the blood or plasma is heated to about 37° C. during the processing cycle. Accordingly, the present invention involves methods of preparing fibrin monomer solutions and compositions from blood or plasma wherein the blood or plasma is heated to about 37° C. prior to and during processing with the thrombin or thrombin-like enzyme. In preferred embodiments, the blood is preheated at low rotational speeds, e.g., 500–2000 RPM, with a heat source which radiates energy in the visible light range and the temperature of the blood is sensed indirectly using the formula $$T\text{ blood} = A\ T\text{ air} + B\ T\text{ surface}$$

where $T$ blood=the temperature of the blood $T$ air=the temperature of the surrounding air $T$ surface=the temperature of the surface of the blood container $A$=a coefficient for the air $B$=a coefficient for the surface of the container.

Using this formula and measuring T air and T surface, the temperature of the blood can be determined. Further, this can be fed into a control unit which controls the heat source.

BRIEF DESCRIPTION OF THE DRAWING

The invention is explained in greater detail below with reference to the accompanying drawing, in which.

DETAILED DESCRIPTION OF PREFERRED EMBODIMENTS

Figure 1:
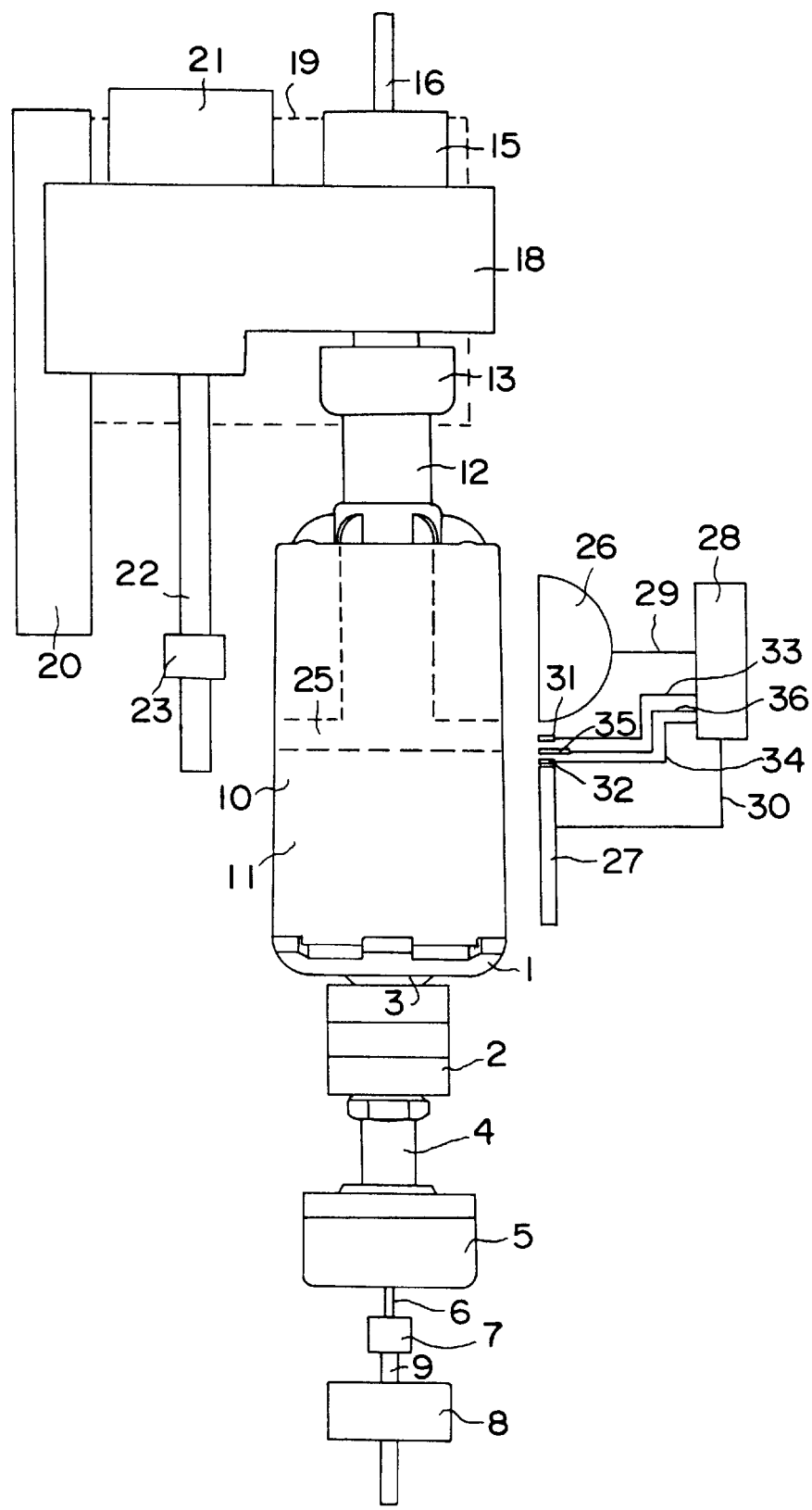
FIG. 1 is a diagrammatic front view of parts of the apparatus according to the invention and with a container arranged therein for the separation of components of a liquid.

In accordance with the present invention an enhanced centrifuge system with capabilities of monitoring and controlling the temperature of a liquid, e.g., blood, during centrifugation is provided. It has been found that subjecting plasma fibrinogen to an enzyme which catalyzes the cleavage of fibrinopeptides A and/or B from fibrinogen, i.e., a thrombin or thrombin-like enzyme which converts fibrinogen to fibrin, proceeds more efficiently when the blood or plasma is at about 37° C. Careful temperature control is important since temperatures too low will not provide the enhanced effect and temperatures exceeding 40° C. can damage the blood component and cells.

According to the invention it is particularly advantageous that the heat-emitting device comprises a first heating source for emission of visible light substantially being directed towards the blood-containing portion, or first chamber, of the centrifuge container. Correspondingly, the wall of the centrifuge container is chosen to be of a visible light transmissive material so that the heat is transferred effectively to the blood with minimal excess heat absorption by the container itself. Medical grade plastics such as polycarbonate are preferred. The resulting utilization of the energy release from the heat-emitting device through the wall to the blood is thus optimal.

Furthermore, the heat-emitting device may according to the invention optionally comprise a second heating source for emission of infrared radiation substantially directed towards a second chamber in the container into which a fraction of the blood will be subsequently transferred for further processing at the desired temperature. In this manner it is possible to keep the container wall absorbing the infrared radiation at a desired temperature.

According to the invention it is particularly preferred that the heat-emitting device is associated with a first temperature sensor for detecting the temperature of the air in the area around the container to be handled, as well as with a second temperature sensor for detecting the temperature of the container surface, and furthermore that a control unit is provided for controlling the heat-emitting device in response to the detected temperatures. Thus it is ensured in a particularly simple manner that the desired temperatures are maintained.

Furthermore, the control unit may according to the invention be adapted to successively activate the first and the second heating source in response to the part of the container running the separating process. In this manner the desired temperatures are ensured in the most advantageous manner.

According to the invention the first heating source may particularly advantageously be a halogen bulb, and the second heating source a heating plate of metal.

The apparatus shown in FIG. 1 comprises a supporting turntable 1 which is rotatably journalled in a housing not shown in greater detail by means of a ball bearing 2, cf. FIG. 2. The supporting turntable is formed integral with a vertical driving shaft 3. The driving shaft is connected through a coupling 4 to a motor 5 causing the supporting turntable to follow a rotating movement about a vertical axis of rotation. An activating bar 6 is rotatably journalled coaxially with the axis of rotation inside the driving shaft 3 of the supporting turntable 1, said activating bar 6 being connected through a coupling 7 with a spindle motor 8 with a spindle 9 in such a manner that when the spindle motor 8 is activated the activating bar 6 can be displaced vertically upwardly or downwardly for a releasable retaining of a container 10 on the supporting turntable 1.

The container 10 is arranged on top of the supporting turntable, said container being of the type described in U.S. Pat. No. 5,603,845 or WO 96/16713, comprising a cylindrical member 11 and a piston 25 shown by means of dotted lines. The piston 25 is driven by means of a tubular piston rod 12 projecting upwardly from the upper end of the container 10. The piston rod 12 is activated by means of a gripping means 13, which in turn is activated by means of a spindle motor 15 through a spindle 16 and a activating bar 17 connected thereto. The gripping means 13 is furthermore rotatably journalled in a housing 18 through a ball bearing 19. The housing 18 and the spindle motor 15 are secured to a common carrier indicated by means of dotted lines at the reference numeral 19. This carrier 19 is displaceably mounted on a rail 20 and caused to be vertically displaced thereon by means of a motor 21. The motor 21 co-operates through a ball spindle with a ball nut 23 stationarily secured in the apparatus in such a manner that a rotation of the ball spindle 22 by means of the motor 21 causes a movement of the carrier 19 and consequently of the gripping means 13 along the slide 20.

The apparatus of FIG. 1 is used in such a manner that the container with its content is subjected to centrifugation heat source, which is preferably described herein as a halogen bulb 26 is arranged substantially opposite the area above the piston 26, cf. the diagrammatic view of FIG. 1, said halogen bulb being adapted to subject this portion of the container 10 to a visible light. In a similar manner a heating plate 27 is arranged substantially opposite the area below the piston 25, cf. the diagrammatic view of FIG. 1 as well, said heating plate 27 subjecting this portion of the container 10 to an infrared radiation. The heating plate 27 can optionally be curved in such a manner that it substantially presents a curvature mating the outer periphery of the container. Both the halogen bulb 26 and the heating plate 27 are connected to a control unit 28 through respective conduits 29 and 30, respectively. The control unit 28 is also connected to temperature sensor 31 and optional sensor 32, respectively, through conduits 33 and 34, respectively. The temperature sensor 31 is adapted to measure the temperature on the surface of the portion of the container 10 above the piston 25 while the temperature sensor 32 is adapted to measure the temperature on the surface of the portion of the container 10 below the piston 25 and these sensors 31, 32 can be, e.g., infrared sensors. In addition, a sensor 35 is provided for measuring the temperature of the air around the container 10. The latter temperature sensor 35 is connected to the control unit 28 through a conduit 36. Both the halogen bulb 26 and the heating plate 27 are controlled by means of the control unit 28 in such a manner that as far as it is possible the blood and the components thereof contained in the container 10 are kept at a temperature of 37° C. during the stay inside the apparatus.

There are several difficulties in accomplishing this. First, the heating element, i.e., the bulb 26, is not in direct contact with the blood to be heated and neither are any of the temperature sensors. Also, the blood is contained within a plastic container which must be taken into account. Further, in many processes using such apparatus, the container with blood is spinning, i.e., being rotated. All of these factors need to be considered since in such a rotating container it is extremely difficult to position temperature probes directly into the blood.

It has been found that the temperature of the blood can be arrived at by indirectly measuring the temperature of the surface of the container and the temperature of the surrounding air using the formula.

$$T_{blood} = AT_{air} + BT_{surface}$$

where $T_{blood}$ is the temperature of the blood, $T_{surface}$ is the temperature on the surface of the container wall 37, and $T_{air}$ is the temperature of the surrounding air.

A and B are coefficients which are functions of the heat transfer coefficient of the air at the surface of the container, respectively, and depend partially on the rate of rotation of the container 10.

Coefficients A and B can be obtained experimentally with a series of trial runs for a given process by experimentally measuring the value of $T_{blood}$, $T_{air}$ and $T_{surface}$ $T_{blood}$ can be measured experimentally by stopping the process and taking direct temperature readings or by using a commercially available "heat pill", i.e., a small temperature sensitive capsule which can be placed into the blood during heating for remote readings. These coefficients can also be obtained theoretically using known equations by taking into account the energy flowing from the container to the air, the energy flowing from the inside of the wall of the container to the outside surface of the wall, and the energy flowing from the liquid (blood) to the container wall, assuming a steady state where all energy is transferred by the container wall and the air. In theoretical calculations, the heat transfer coefficient of the air depends of the rotational speed of the container in a directly proportioned manner.

In practice the rotational speed increases the coefficients A and B with higher rotational speeds. Higher coefficients are believed to make the above formula less sensitive and less accurate therefore lower rotational speeds, for example, 500–2500 RPM, have been found useful for preheating blood (about 100–150 ml) in a cylindrical centrifuge contained for processing. Preferably the speed during initial heating and temperature stabilization is about 1000 RPM. These speeds are useful in that they keep the coefficient values for A and B lower and yet providing a gently mixing of the blood and movement of the outside air for more uniform heating.

As mentioned above, the halogen bulb has been chosen because it emits an essentially visible light, the energy of which passes substantially freely through the container wall 37 and directly into the blood portion 38 without having undue amounts of heat energy absorbed by the material of the container wall.

An optional heating plate 27 emitting an infrared light has been chosen for heating the portion of the container below the piston 25 because the energy of infrared light is absorbed in the material of the container wall 37. Such a choice of light is the most advantageous choice for this portion of the container 10 because nothing but a relatively small amount of liquid is present inside the container wall 37 in this portion. Therefore the heating plate 27 is solely controlled by a measuring of the surface temperature of the container wall on this portion of the container. This temperature is, as mentioned, measured by means of the temperature sensor 32.

When the described apparatus is used, the halogen bulb 26 is initially activated, and this activation continues as long as the blood portion positioned above the piston 25 is subjected to a centrifuging, and the desired separated component is transferred from this position to the area below the piston 25 by way of an actuation of the piston 25 through the piston rod 12. Subsequently, the halogen bulb 26 is turned off and actuates thereby the heating plate 27 so as to heat the lowermost portion of the container 10 during the continued step of the separation procedure.

The invention has been described with reference to a preferred embodiment. Many modifications can be carried out without thereby deviating from the scope of the invention. It is for instance possible to use other heating sources emitting the desired light beams instead of the above heating sources, viz. the halogen bulb 26 and the heating plate 27. Only one heating source can, if desired, be used for covering the entire container provided said heating source emits light beams of both types. The above constants A and B have been calculated in consideration of the visible light from the halogen bulb passing almost freely through the container wall 37, which is the case when said container wall is made of polycarbonate, which it often is. When the container is made of another plastic material, it can be necessary to adjust the coefficients in question in response thereto, said coefficients being found by way of practical tests as described herein.

We claim:

1. An apparatus for centrifuging and controlling the temperature in a container (10) for separating a component, from plasma, wherein said container (10) comprises a cylindrical member (11) having a top wall, bottom wall, inner wall and outer wall and a piston (25) displaceable therein and comprising a tubular piston rod (12), which extends through said top wall, and where said piston (25) divides the cylindrical member (11) into a first chamber positioned above said piston (25) between said piston and said top wall and a second chamber positioned below said piston (25), and where said apparatus comprises a supporting turntable (1) with means for releasably retaining the cylindrical member (11), said supporting turntable being connected to a first activating means (5) for rotating the supporting turntable (1) with the container (10) about the central axis thereof, and where said apparatus further comprises a rotatably journalled piston activating mechanism (13, 15, 16) adapted to activate the piston by means of a second activating means (21), characterised in that a heat-emitting device (26, 27) is provided proximate to said outer wall of the cylindrical member (11).

2. An apparatus as claimed in claim 1, characterised in that the heat-emitting device (26, 27) comprises a first heating source (26) for emitting visible light substantially directed towards the position of the first chamber in the container (10) to be handled.

3. An apparatus as claimed in claim 2, characterised in that the heat-emitting device (26, 27) comprises a second heating source (27) emission of infrared radiation substantially directed towards the position of the second chamber in the container (10) to be handled.

4. The apparatus as claimed in claim 1, characterised in that the heat-emitting device (26, 27) is associated with a first temperature sensor (35) for detecting the temperature of the air in the area around said outer surface, a second temperature sensor (31, 32) for detecting the temperature of the surface, and a control unit (28) for controlling the heat-emitting device (26, 27) in response to the detected temperatures.

5. The apparatus as claimed in claim 4, characterised in that the control unit (28) is adapted to successively activate the first and the second heating source (26, 27) in response to a part of the container (10).

6. The apparatus as claimed in claim 1, characterised in that the first heating source (26) is a halogen bulb.

7. The apparatus as claimed in claim 1, characterised in that the second heating source (27) is a heating plate of metal.

8. A method of indirectly determining the temperature of a blood sample in a container having an outer surface which comprises
   a) measuring the temperature of the outer surface of the container;
   b) measuring the temperature of the air surrounding the container; and
   c) utilizing the formula $$T_{blood} = AT_{air} + BT_{surface}$$

where
   A is a heat transfer coefficient for the surrounding air;
   B is a heat transfer coefficient for the surface of the container;

T is the temperature of the air;

T is the temperature of the outer surface; and

T is the temperature of the blood sample to solve for the temperature of the blood.

9. A method of controlling the temperature of blood in a container which comprises utilizing an apparatus comprising a container with blood therein, a heat source and a control unit for said heat source which control unit is responsive to an indirect determination as provided in claim 8.

* * * * *